July 11, 1967 J. SONNER 3,330,043
VEHICLE FRAME DEVICE
Filed Oct. 21, 1964 2 Sheets-Sheet 1

Inventor:
Josef Sonner
By: Spencer & Kaye
ATTORNEYS

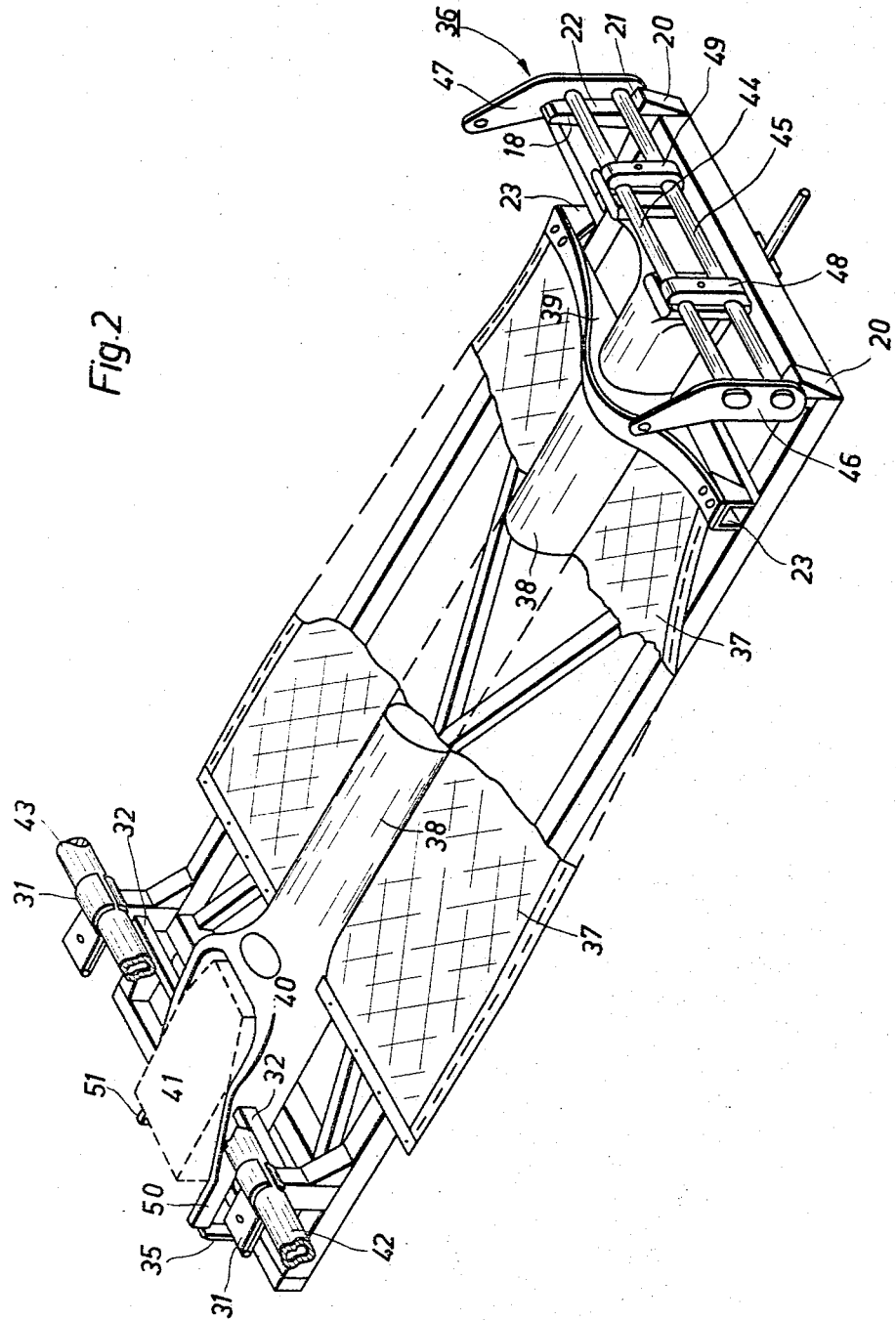

United States Patent Office 3,330,043
Patented July 11, 1967

3,330,043
VEHICLE FRAME DEVICE
Josef Sonner, Deisenhofener Weg 1, Strasslach,
near Munich, Germany
Filed Oct. 21, 1964, Ser. No. 405,389
7 Claims. (Cl. 33—174)

ABSTRACT OF THE DISCLOSURE

A device for measuring and adjusting self-supporting frames of the Volkswagen 1200 type, which device includes a reinforced rectangular frame and abutments arranged at each end of the frame. The device is easily movable for attachment to a vehicle and eliminates the need for removing the vehicle body or disassembling the vehicle chassis in order to inspect its frame for damage or warpage.

---

The present invention relates to a device for examining, measuring, and adjusting self-supporting vehicle frames of the Volkswagen 1200 type, as well as for replacing the frame heads during repairs.

This device makes it possible to examine and measure vehicles of the Volkswagen 1200 type and particularly the frames thereof, in the assembled state, with respect to possible warpage or distortion, and to make adjustments in case the frame should have been warped. Furthermore, the device serves as clamping unit allowing replacement of the frame heads if they are too severely damaged.

Previously, it has been necessary, for the purpose of examining the frame and/or during the repair of a somewhat warped frame, to lift off the automobile body and to disassemble the chassis so that the frame could then be inspected by means of a stationary frame gauge.

It is an object of the invention to avoid these disadvantages.

It is a further object of the invention to provide a device for measuring vehicle frames to detect warpage, without removing the body or disassembling the chassis, which device is capable of rigidly clamping the frame to perform repairs.

Additional objects and advantages of the present invention will become apparent upon consideration of the following description when taken in conjunction with the accompanying drawings in which:

FIGURE 2 is a perspective view showing the frame of the device mounted on the frame of a vehicle (Volkswagen 1200 or Ghia 1200 coupe) to be tested, which is shown schematically.

Figure 1:
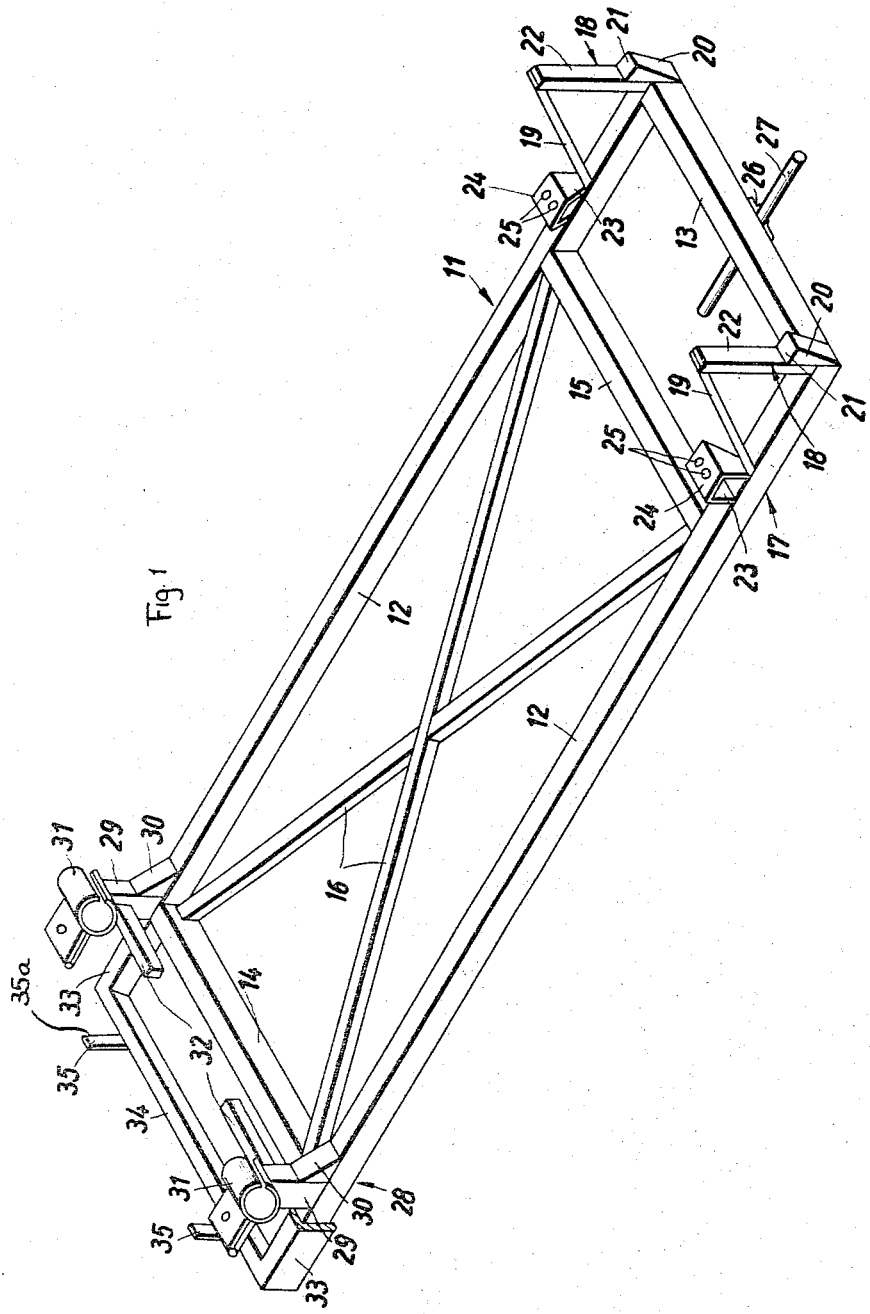
FIGURE 1 is a perspective view of an embodiment of the invention.

The inventive device for the examination, measurement, and adjustment of the vehicle frames under consideration comprises essentially a rectangular frame of profiled steel bars, or rails, which frame is reinforced by transverse and/or diagonal struts. The frame is easily movable so that it may be attached to or placed against a vehicle, as is described in detail below. Thanks to the invention, it is no longer necessary to remove the body or to disassemble the chassis in order to inspect the frame for warpage. Moreover, the frame may be inspected in a much shorter time than was previously possible, and with no decrease in accuracy or precision from that achieved by testing the frame in a disassembled state, using a stationary non-portable gauge.

At the front end of the rectangular frame of the device, in each of the two corners, there is provided a vertical, supported strut which extends upwardly with respect to the plane of the frame and which carries a supporting chock in front of it. Each strut has a vertical, and each chock has an adjacent horizontal abutment surface, all of which serve to contact the front axle body of the vehicle to be measured. The term "abutment surface" is used throughout the specification to mean a finished surface which is squared off with respect to the frame and which is designed to contact a predetermined element of the vehicle frame when the device is attached thereto. Supporting chocks are also provided a certain distance behind the front corner supports on the longitudinal rails of the frame; these supporting chocks have holes in their upper horizontal surfaces through which bolts may be passed for attaching the device to the frame of a vehicle, specifically to the front cross member of a vehicle frame.

At the rear end of the frame of the device, trusses are provided which are braced against the longitudinal bars of the frame. These trusses likewise extend upwardly with respect to the plane of the frame and carry, at their upper ends, clamping collars which can be pivoted open for the purpose of attaching the frame of the device to the rear-axle housing tubes of the frame of the vehicle.

Furthermore, according to the invention, struts of predetermined length are mounted at the upper ends of the last-mentioned trusses. These struts extend toward each other and lie in a line. The front surfaces of these struts form abutment surfaces for the forked transmission suspending unit when the device is attached to the vehicle frame.

Finally, an additional transverse member is provided at the rear end of the frame of the device which, if desired, can be detachable. Struts are mounted on this transverse member which extend up upwardly with respect to the plane of the frame, and which are provided with sharply defined edges for accurately measuring the position of the rear ends of the forked transmission suspension unit.

Advantageously, a handle bar comprising a piece of pipe which is insertable into a bracket can be mounted at the front end of the frame, in order to facilitate the lifting of the front end of the device when it lies underneath the vehicle frame.

Referring now specifically to the drawing, an essential part of the device is the frame 11, shown in FIGURE 1, which is formed of rectangular tubes. The frame includes two longitudinal rails 12, the front traverse 13 and the rear traverse 14. At the front end, between the longitudinal rails 12, there is an additional traverse 15. For the purpose of reinforcing the structure, two diagonal struts 16 are provided within the frame 11. At the front end 17 of the frame 11, at the ends of the longitudinal bars 12, there are provided struts 18, extending upwardly and braced at the rear by obliquely mounted struts 19. Supporting chocks 20 are provided at the vertical struts 18; the upper horizontal surfaces 21 of the chocks, as well as the front surfaces 22 of the vertical struts 18, form abutment surfaces for the front axle body at the head of the vehicle frame.

Furthermore, one supporting chock 23 is mounted on each of the longitudinal rails 12 at the front end 17 of the frame 11. In the upper horizontal abutment surfaces 24 of these supporting chocks there are provided holes 25 through which fastening bolts are passed, for attaching the frame of the device to the underside of the vehicle frame.

At the front traverse 13 a clamping collar 26 is mounted, which holds a handle bar in the form of a piece of pipe or a bar 27. This handle bar is shiftable backward and forward in the clamping collar, facilitating the lifting of frame 11.

At the rear end 28 of frame 11, upwardly extending struts 29, supported by wedges 30, are mounted on the longitudinal rails. Each strut 29 carries at its upper end a clamping collar 31 which can be flipped open, and which allows the rear of the device to be attached to the vehicle frame. These collars have holes 31a in their flat portions for receiving bolts to hold them shut. In addition struts 32, which extend toward each other, are provided at the upper ends of the struts 29, the front surfaces of struts 32 forming abutment surfaces for the forked transmission suspension unit at the rear of the vehicle frame.

At the rear end of the frame 11, the longitudinal rails 12 are preferably open so that the longitudinal rods 33 attached to traverse 34, can be inserted into them up to a stop. Stops may be provided inside the rails 12. Struts 35, having sharply defined abutment surfaces 35a, are provided on traverse member 34 for gauging the position of the rear end of the forked transmission suspension unit. In order to facilitate operation of the device, the transverse member 34 is detachable from the rest of the device. It is, of course, possible to make the device with transverse member 34 attached permanently to the frame 11.

From FIGURE 2 it can be seen more clearly how the different parts of the vehicle frame engage the testing device. The basic structural element of the vehicle frame are the front axle body 36 the bottom plate 37, the frame tunnel 38, the front cross member 39 and the forked transmission suspension unit 40. The frame also includes the gear box 41 of the vehicle, and rear-axle housing tubes 42 and 43. It should be noted that elements 40 to 43 are shown only schematically, to give an idea of the assembly. The actual construction and arrangement of these parts is more complex. As can be seen, the front axle body 36, on which the front wheels and the corresponding steering suspensions are mounted, is comprised of two parallel front axle tubes 44 and 45, held at the ends by members 46 and 47. The front axle tubes are fastened to the frame tunnel 38 by clamps 48 and 49. Where the vehicle frame is not distorted or warped, these tubes make contact with the abutment surfaces of struts 18 and chocks 20 at six points. These points are:

Rear periphery of upper tube 44 contacts the front surface 22 of struts 18 (two points);
Rear periphery of upper tube 44 contacts the front surface 22 of struts 18 (two points);
Bottom periphery of lower tube 45 contacts the horizontal surface 21 of chocks 20 (two points).

There are two further testing points at the rear of the device. These are the rearmost ends of the fork bars 50 and 51; in practise, nuts screwed down to both forks are used as measuring points. The alignment of the fork is measured by the position of the nuts relative to the top inner edges of struts 35.

In order to test the vehicle frame for warpage, elongation or distortion, the vehicle may be moved over a greatse pit (the device being supported at its open end) or the vehicle may be lifted by four jacks, and the device slipped under the car. The collars 31 of the device—previously flipped open, and which have a diameter greater than that of the rear axle housing tube 42, 43—are closed over the houseing tubes and bolted together. Thus the device is hinged to the car at the rear, and may be pivoted upward toward the front of the vehicle. When the device contacts the front axle body 36, the above-mentioned six contact points are tested with the aid of a feeler gauge. The two contact points at the rear of the vehicle are tested in the same manner.

The device may also be used, in a similar manner, to mount a new front axle body on the vehicle frame. In this case the vehicle frame is bolted to the chocks 24, which correctly position the frame to receive the new front axle body. The latter is correctly aligned when it rests correctly against the aforementioned six front contact points.

It will be understood that the above description of the present invention is susceptible to various modifications, changes, and adaptations, and the same are intended to be comprehended within the meaning and range of equivalents of the appended claims.

What is claimed is:

1. A device for measuring and adjusting self-supporting vehicle frames of the Volkswagen 1200 type, said device comprising, in combination:
   a plurality of profiled rails forming a rectangular frame having front and rear ends;
   at least one reinforcing member for maintaining the rectangular shape of the frame;
   a first strut at each front corner of the frame and perpendicular to the plane of the frame, both said first struts extending in the same direction and defining first abutment surfaces in a common plane;
   means for supporting each first strut in a position perpendicular to the plane of the frame;
   a first chock on the frame adjacent each strut, and including a second abutment surface adjacent and substantially perpendicular to the first abutment surface, so that the first and second abutment surfaces can support the front axle of a vehicle;
   a pair of second chocks, each on one side of the frame and rearward of the first struts, each second chock having holes therein for bolting the device to a vehicle frame;
   a braced strut in each rear corner of the frame, extending in the same direction as the first struts; and
   a clamping collar on the end of each braced strut for clamping the rear of the frame to a vehicle frame.

2. A device as defined in claim 1, further including a pair of second struts extending parallel to the plane of the frame, each extending from one of the braced struts and each extending toward the other, so that they lie in a line, and including abutment surfaces on their ends for contacting the rear forked transmission suspension unit on the vehicle frame.

3. A device as defined in claim 2, further including a transverse element mounted at the rear end of the frame, and a pair of third struts extending therefrom in a direction parallel to the first struts each third strut including an abutment surface and an abutment edge for aligning the rear end of the forked transmission suspension unit of a vehicle.

4. A device as defined in claim 3, wherein the transverse element is detachably mounted on the frame.

5. A device as defined in claim 4, further including:
   a section of pipe for use as a handle; and
   means for slidably mounting the section of pipe at the front end of the frame, so that the pipe may be moved frontwardly and rearwardly in its mounting.

6. A device as defined in claim 5, wherein the reinforcing member is a transverse rail parallel to the front of the frame and joining the sides thereof.

7. A device as defined in claim 5, wherein the reinforcing member is an X-shaped member, attached to and in the plane of the frame.

References Cited
UNITED STATES PATENTS

| | | | |
|---|---|---|---|
| 1,398,359 | 11/1921 | Campbell | 33—174 X |
| 2,270,158 | 1/1942 | Baesgen et al. | 33—174 |
| 2,397,517 | 4/1946 | Taylor | 33—174 X |

LEONARD FORMAN, *Primary Examiner.*

SAMUEL S. MATTHEWS, *Examiner.*